UNITED STATES PATENT OFFICE.

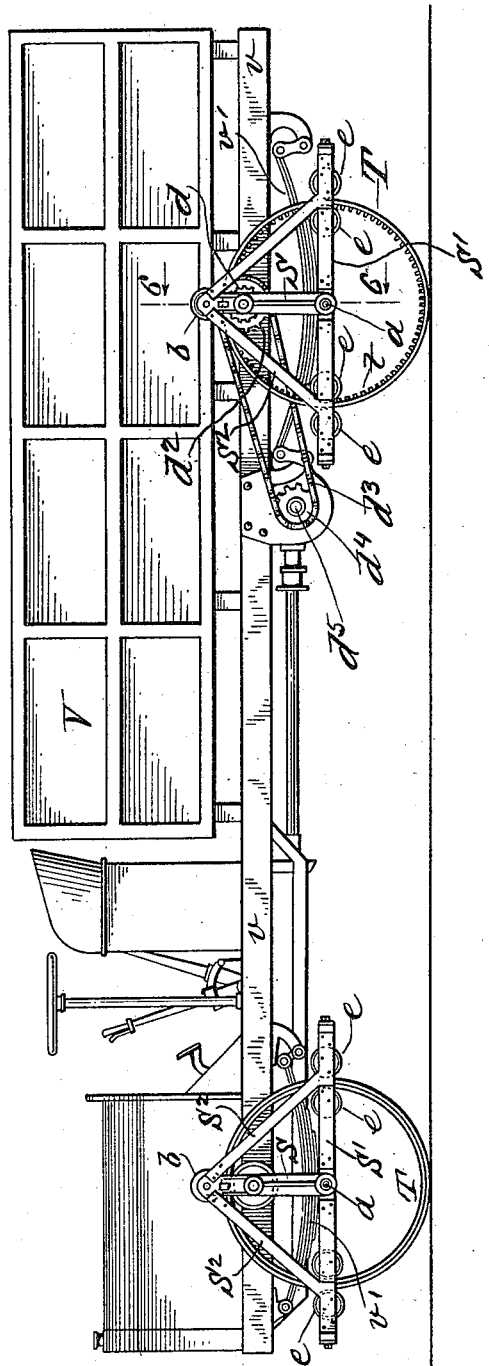

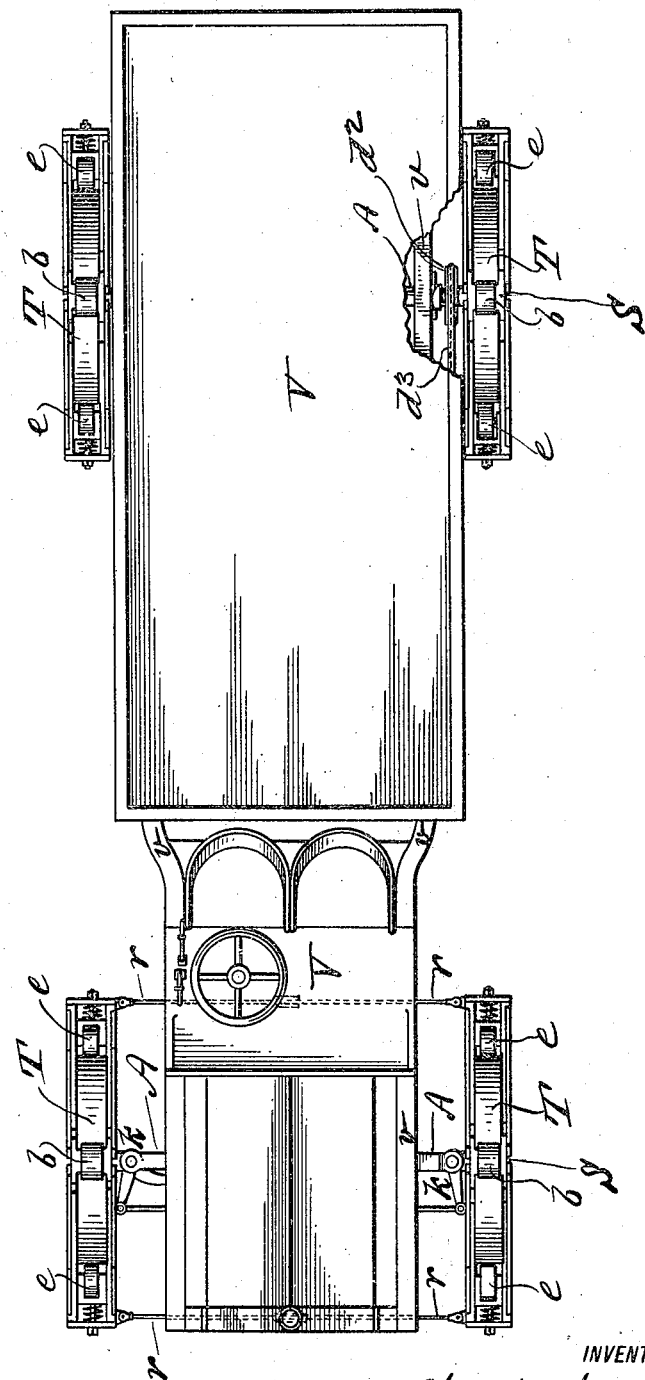

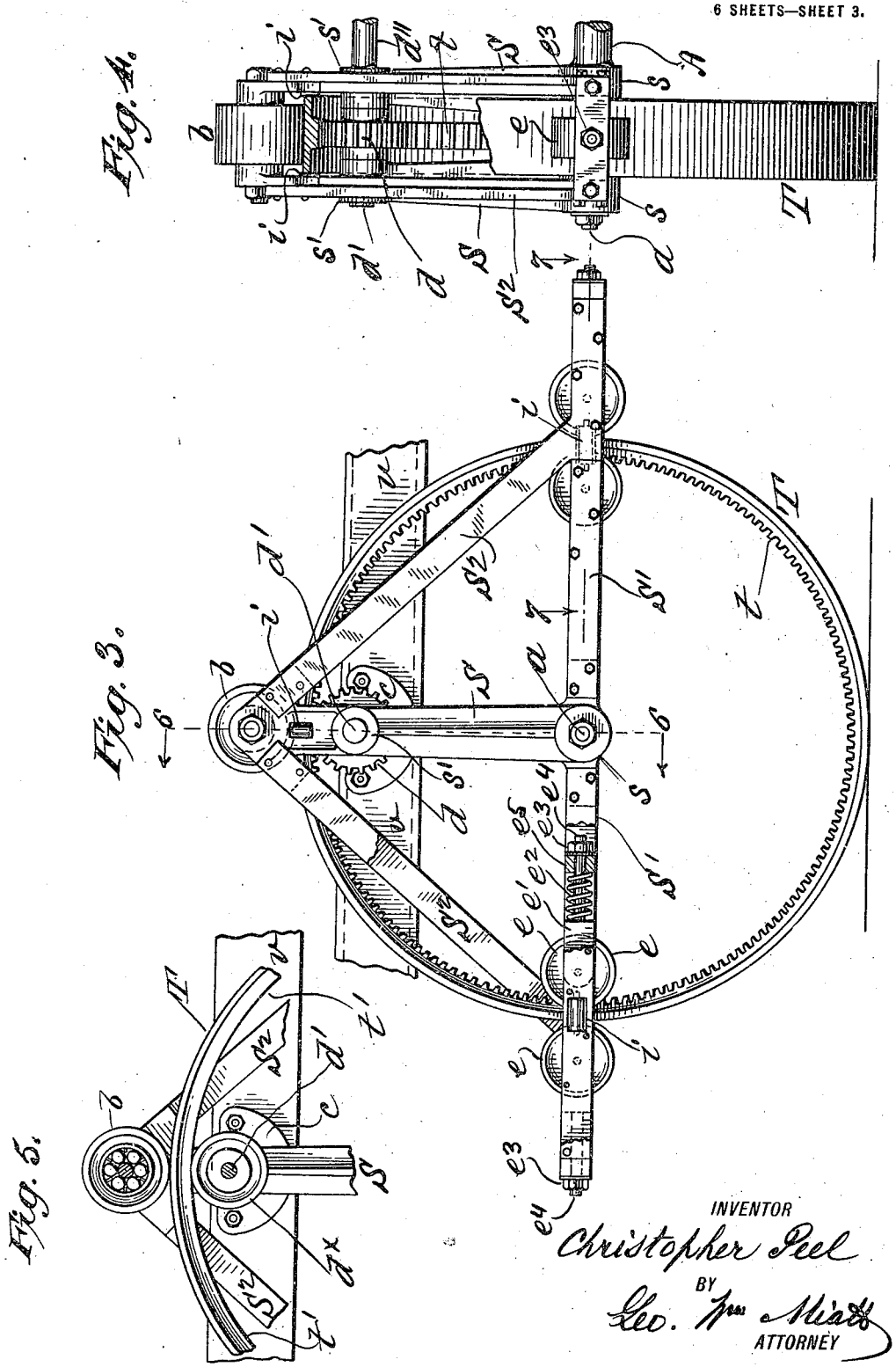

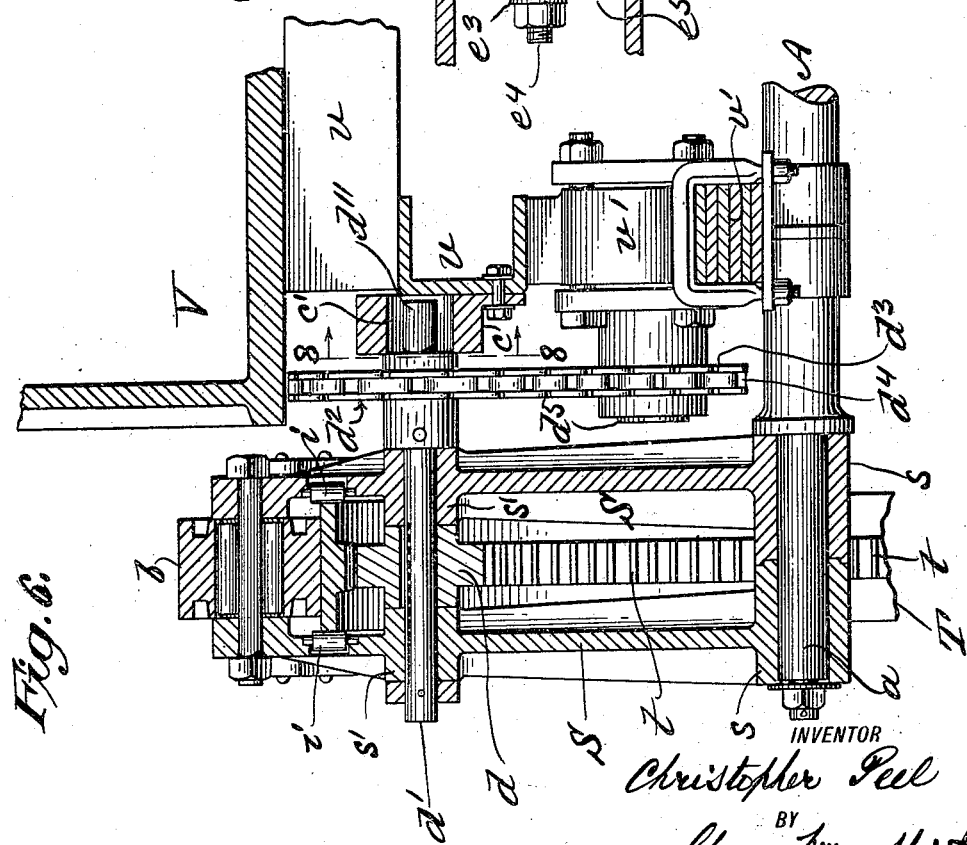

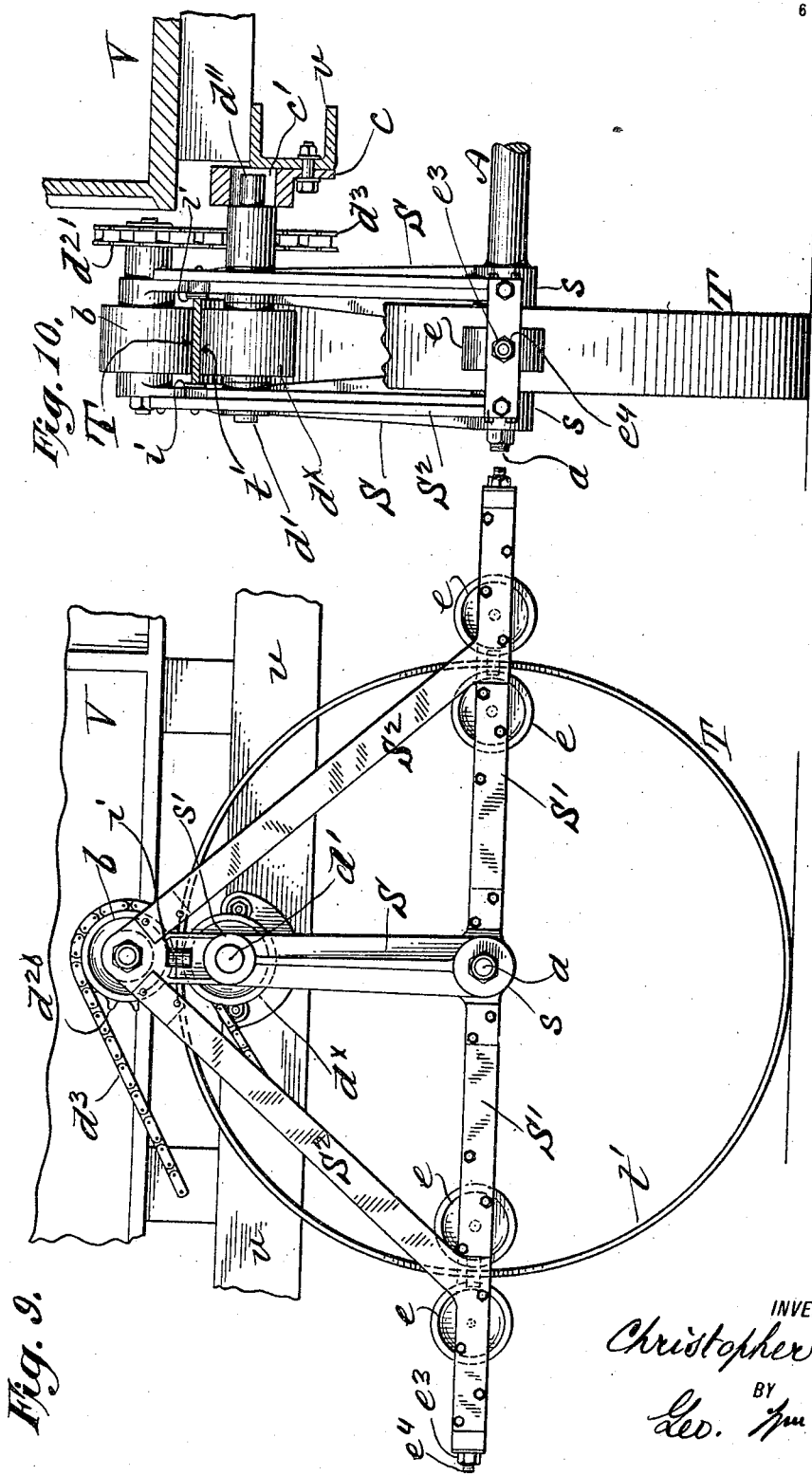

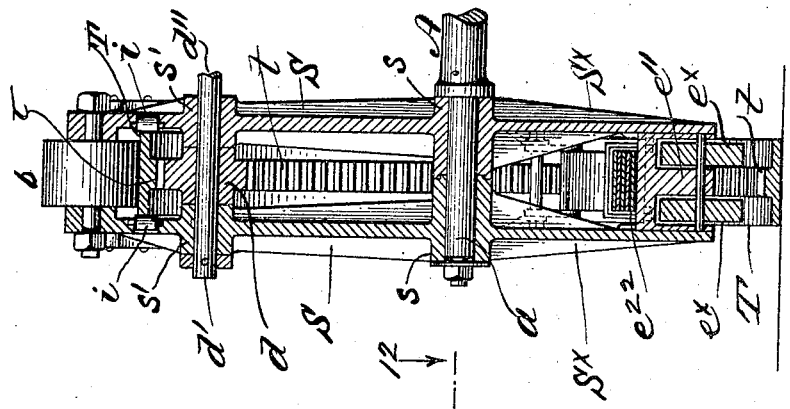
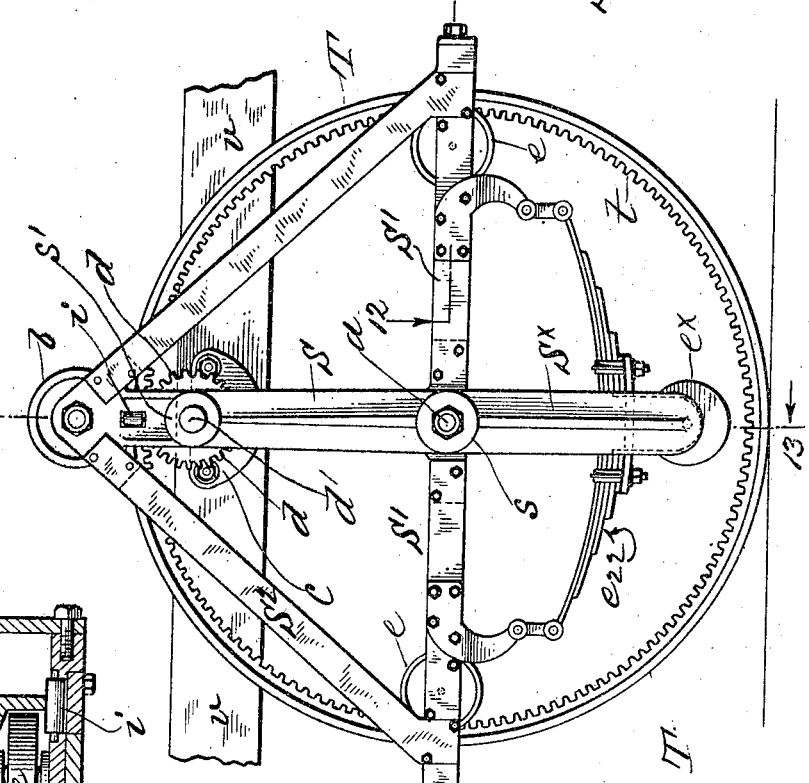
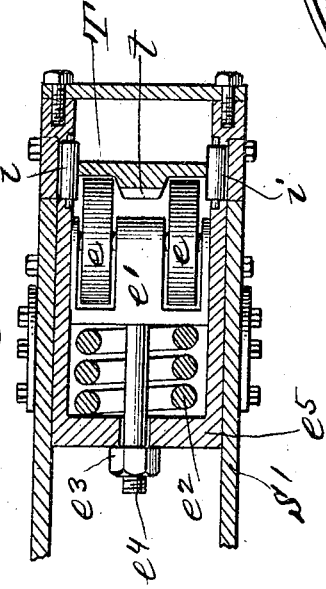

CHRISTOPHER PEEL, OF COSCOB, CONNECTICUT.

VEHICLE-WHEEL.

1,255,046.   Specification of Letters Patent.   Patented Jan. 29, 1918.

Application filed July 11, 1917. Serial No. 179,814.

*To all whom it may concern:*

Be it known that I, CHRISTOPHER PEEL, a citizen of the United States, and a resident of Coscob, county of Fairfield, and State of Connecticut, have invented certain new and useful Improvements in Vehicle-Wheels, of which the following is a specification.

My improvements relate to traction wheels generally, but more particularly to those of the elastic resilient tire type, and are designed mainly to dispense with the use of rubber treads, pneumatic cores, and other shock absorbing and compensating cushion devices heretofore known and used, but which have proven unsatisfactory in many respects owing to lack of durability, inefficiency, etc.

My invention consists primarily in the provision and use of an annular tread member of spring steel or equivalent elastic resilient material upon the upper peripheral portion of which the load is carried; and secondarily in the combination therewith of adjunctive devices for actuating and controlling said annular elastic resilient tread member, all as hereinafter fully set forth.

In the accompanying drawings,

Figure 1, is a side elevation of a motor vehicle provided with my improved means of traction;

Fig. 2, is a plan thereof;

Fig. 3, is a side elevation, upon a larger scale, of one of the rear drive wheels and connections, broken away in part;

Fig. 4, is a front or rear elevation of the wheel etc., shown in Fig. 3, partly in sectional elevation;

Fig. 5, is a sectional elevation showing in detail the load rollers contacting with the upper part of one of the fore wheels of the vehicle;

Fig. 6, is a sectional elevation taken upon plane of line 6—6, Fig. 3, showing the drive mechanism of one of the rear wheels and parts adjacent thereto;

Fig. 7, is a sectional elevation taken upon plane of line 7—7, Fig. 3;

Fig. 8, is a sectional elevation taken upon plane of line 8—8, Fig. 6;

Fig. 9, is an elevation of a rear wheel as rotated by a frictional drive roller;

Fig. 10, is a rear elevation of the parts shown in Fig. 9, partly in sectional elevation;

Fig. 11, is a side elevation of a wheel and adjuncts embodying a modification;

Fig. 12, is a sectional elevation taken on plane of line 12—12, Fig. 11, but on a larger scale;

Fig. 13, is a sectional elevation taken upon plane of line 13—13, Fig. 11.

I herein show and describe my invention as applied to a motor truck, although it is obvious that the essential features thereof may be applied to the support and traction of vehicles generally.

A distinctive feature of my construction and arrangement of parts is the suspension of the axles and "load" on the upper portions of the annular elastic resilient treads T, T. Thus in Fig. 1, of the drawings the chassis $v$, of the vehicle V, is supported on the leaf springs $v'$, in turn supported upon the axles A, A, and the journals $a$, $a$, of the latter are supported in bearings $s$, $s$, on suspenders S, S, pendent from load-carrying rollers $b$, $b$, contacting with the upper peripheral surfaces of the annular elastic resilient treads T, T.

Where the treads T, T, are used as drivers, as is usually the case with the rear wheels of an automobile or motor truck, said elastic resilient treads T, are each preferably formed with an internal central annular rack $t$, the teeth of which mesh with a drive pinion $d$, the journal $d'$, of which is mounted in bearings $s'$, $s'$, formed for it in the suspenders S, S, as shown more particularly in Figs. 6, and 13,—the inner extension of each of said journals $d'$, having rigidly mounted thereon a sprocket wheel $d^2$, (Fig. 1) which is connected by a sprocket chain $d^3$, with a sprocket wheel $d^4$, on the power shaft $d^5$, driven by a suitable motor mounted on the vehicle body. By this means the drive treads T, may be positively rotated to propel the vehicle in either direction by means well known in the art.

This positive gear drive is desirable for heavy traction purposes, and for ordinary conditions of use, but for lighter vehicles, or where roads warrant it, the drive treads may be rotated by frictional contact only, as shown for instance in Figs. 9 and 10, in which the internal rack teeth $t$, are omitted and the power is applied by the sprocket chain $d^3$, directly to a sprocket wheel $d^{21}$, on the shaft of the load-carrying roller $b$,— the drive pinion $d$, being replaced by a plain friction roller $d^x$, mounted on the journal $d'$, and contacting with a plain inner surface $t'$, of the tire T.

In either case a rear extension $d''$, of the journal $d'$, protrudes into a vertical slot $c'$, in a bracket socket piece $c$, rigidly secured to a fixed part, such as the chassis $v$, as shown particularly in Figs. 8 and 10. The side walls of the slot $c'$, support the journal $d'$, against lateral play while providing for a prescribed degree of vertical movement, to allow said journal $d'$, to adapt itself to load strain, and to vertical vibration of the tread T, during the exigencies of travel etc.,—the load-carrying roller $b$, tending constantly to maintain engagement between itself and the tread T, and the latter in engagement with pinion $d$, or plain friction roller $d^x$, as the case may be,—it being of course understood that both rear or drive wheels are, by preference, arranged and equipped as above set forth to afford requisite balance to the drive.

In order to keep the center of the annular tread T, in substantial vertical alinement with the load-carrying roller $b$, and to limit the horizontal expansion or contraction of the tread T, within prescribed bounds of safety, etc., I provide buffers $e, e$, for contacting with the tread when it is unduly deflected or bent out of its normal circular shape. These preferably consist of rollers $e$, mounted in such manner as to render them, as buffers, elastic and resilient, so as to yield under pressure while tending constantly to maintain the normal circular shape of the treads T. Where the internal rack $t$, and drive pinion $d$, is used these rollers $e, e$, are arranged in pairs as shown in Figs. 7 and 12, so as to straddle said tooth rack $t$; and in any case they are mounted in slidable bearings $e'$, backed by buffer springs $e^2$, which tend constantly to thrust the rollers $e$, toward the tread T,—the thrust of the springs $e^2$, however being limited and prescribed by suitable means, as by shoulders $e^3$, on rods $e^4$, attached to the slidable bearings $e'$. Thus as in Figs. 3, 7 and 12, in each case a coiled spring $e^2$, is interposed between the slidable bearing $e'$, and a fixed part $e^5$, and the end of the rod $e^4$, is threaded to receive a nut $e^3$, which the spring $e^2$, tends to cause to abut against said stationary part $e^5$,—the nut constituting an adjustable shoulder or stop by which the normal space between the roller $e$, and the tread T, may be regulated,—the intent being that the roller $e$, shall only contact with the tread T, when the latter is deflected from normal circular shape, and that when so deflected the rollers and springs shall limit such deflection in either direction and at the same time reinforce and sustain the tread and relieve it of undue strain.

Hence these spring buffers $e$, are an important factor in the practical operation of my elastic resilient tire T, since their function is not only to centralize it with relation to the load-carrying roller $b$, and to limit and prescribe the extent of its lateral deflection, but also to absorb and counteract jar and strain, and this with the least possible degree of frictional resistance to the rotation of the tire.

In Figs. 1, 2, 3, 4, 7 and 9, of the drawings such elastic resilient buffers $e$, are shown as positioned on opposite sides of the tire T, and inside and outside as related thereto,—(i. e., to contact on occasion with the external and internal peripheries of the tire); and their slidable bearings $e'$, are mounted upon and between horizontal extensions $S'$, of the suspenders S, said extensions being braced thereon by truss members $S^2$,—those buffers $e$, on the outside of the tire T, limiting the tendency of the tire under load and stress to assume elliptical form in a horizontal direction, while those inside the tread in like manner counteract the tendency of the tread to elliptical extension in a vertical direction when passing over inequalities in the surface traversed, or encountering unusual resistance to advancement etc.

In the modification shown in Figs. 11, 12, and 13, the external buffers $e, e$, are replaced by a single buffer $e^x$, consisting of twin rollers mounted on a slidable bearing $e''$, suspended upon leaf springs $e^{22}$, attached to the horizontal extensions $S'$, of the suspenders S, the latter being formed with lower extensions $S^x$, which guide and support the bearing $e''$, laterally. Obviously by limiting the extent of vertical depression of the tread the buffer $e^x$, will restrict the elliptical extension of the tread in a horizontal direction, while the internal buffers $e, e$, limit elliptical extension in a vertical direction. The advantage of this arrangement is mainly that the device is more self-contained, horizontal protrusion of parts beyond the tread being reduced to the minimum degree.

Anti-friction rollers $i, i$, are mounted on the suspenders S, and on its extensions $S'$, $S'$, and so positioned as to bear against opposite edges of the tread T, as shown more especially in Figs. 3, 4, 6, 7, 11 and 12, for the purpose of maintaining the tread in correct alinement; and the load-carrying rollers $b$, or any other of the rollers or gears may be mounted on anti-friction bearings if desired, as illustrated in the case of the load-supporting rollers $b$, in Figs. 5 and 6.

When my invention is applied to the front wheels of automobiles etc., in which the axle journals are mounted on the usual knuckles $k, k$, (Fig. 2) to facilitate the steering of the vehicle in the ordinary manner, the extensions $S', S'$, of the suspenders S, S, on opposite sides of the vehicle are preferably coupled together by link rods $r, r$, thereby insuring the parallelism of the tires T, T, on opposite sides of the vehicle under all conditions of use, and reinforcing the knuckles $k$, $k$, and journals $a$, $a$, against undue strain.

It is to be understood that even if no driving power were applied directly to my elastic resilient treads T, the vehicle being simply hauled along as by horse or other traction, the frictional contact of my treads with the ground would insure their rotation, the power in such case being applied to the treads through the axle A, and its journal $a$, and the elastic resilient buffers $e$, $e$, acting to centralize the treads and to limit their elliptical deflection as hereinbefore set forth, and as illustrated in the case of the front wheels of the vehicle herein shown; whereas when the power is applied directly to driven treads, as illustrated in connection with the rear wheels of the vehicle herein shown, the power is transmitted through the drive wheels, load rollers, buffer rollers and suspenders to the axle to draw the vehicle.

In either case the elasticity and resilience of my "floating" or free treads insures easy riding under all conditions of use with all the advantages attained by pneumatic and cushion tires, and without any of the disadvantages thereof, since it is puncture proof and practically indestructible in a commercial sense, its "life" and durability far exceeding any other elastic resilient tire or tread as far as known.

Furthermore my elastic resilient tread is instantly responsive to any jar or excess of strain, and the latter is immediately taken up and absorbed by the whole tread, since the latter is in effect simply a flat spring hoop untrammeled by felly, spokes or hubs,—the tread being free throughout its whole circumference to respond to, distribute, and neutralize weight or pressure however applied.

It is to be noted that in my construction and arrangement of parts the buffer rollers $e$, $e$, are in horizontal alinement with the journals $a$, $a$, as shown in Figs. 1, 3, 9, and 11; and that in the modification shown in Fig. 11, the auxiliary buffer $e^x$, is in vertical alinement with the journal $a$, and the axis of the load-carrying roller $b$. By this means the tire T, is restricted and controlled on the medial lines of its greatest deflection from a true circle during ordinary conditions of traction, the spring of the ring T, in use, being mainly in vertical and horizontal planes. Furthermore this arrangement of the buffer rollers affords the least possible degree of frictional resistance to the rotation or rolling of the free or floating hoop tire T, while tending constantly to maintain its normal circular shape.

What I claim as my invention and desire to secure by Letters Patent is,

1. A wheel of the character designated comprising an annular elastic resilient tread, a load-supporting roller outside of and bearing upon the upper periphery of said tread, and means in horizontal alinement with the axle journal for contacting with the tread when the latter is unduly deflected out of its normal circular shape, to retain the center of the tread substantially in vertical alinement with the axis of said load-supporting roller.

2. A wheel of the character designated comprising an annular elastic resilient tread, a load-supporting roller outside of and bearing upon the upper periphery of said tread, means in horizontal alinement with the axle journal for contacting with the tread when the latter is unduly deflected, said means being elastic and resilient.

3. A wheel of the character designated, comprising an annular elastic resilient tread, a load-supporting roller bearing upon the upper periphery of said tread, and elastic resilient means in horizontal alinement with the axle journal for retaining the center of said tread substantially in vertical alinement with the axis of said load supporting roller, and for limiting the elliptical deflection of said tread, for the purpose described.

4. A wheel of the character designated, comprising an annular elastic resilient tread, a load-supporting roller bearing upon the upper periphery of said tread, and elastic resilient means contacting with the tread when the latter is unduly deflected out of its normal circular shape.

5. A wheel of the character designated, comprising an annular elastic resilient tread, a load-supporting roller bearing upon the upper periphery of said tread, elastic resilient means contacting with the tread when the latter is unduly deflected out of its normal circular shape, and means for positively applying power to said tread.

6. A wheel of the character designated, comprising an annular elastic resilient tread, a load-supporting roller bearing upon the upper periphery of said tread, elastic resilient means contacting with the tread when the latter is unduly deflected out of its normal circular shape, a toothed rack on the tread, and a drive pinion meshing with said rack.

7. A wheel of the character designated, comprising an annular elastic resilient tread, a load supporting roller bearing upon the upper external periphery of said tread, an opposed wheel bearing against the inner surface of the tread in vertical alinement with said load supporting roller, and means for retaining the center of said tread substantially in vertical alinement with the axes of said load supporting roller and said opposed bearing wheel, for the purpose described.

8. A wheel of the character designated, comprising an annular elastic resilient tread, a load supporting roller bearing upon the upper external periphery of said tread, an opposed wheel bearing against the inner surface of the tread in vertical alinement with said load supporting roller, means for supporting said opposed bearing wheel against lateral movement while admitting of its vertical movement.

9. A wheel of the character designated, comprising an annular elastic tread, a load-supporting roller bearing upon the upper periphery of said tread, means contacting upon the inner and outer periphery of said tread in opposition to said roller and yieldable to limit the horizontal expansion and contraction of the tread.

10. A wheel of the character designated, comprising an annular elastic resilient tread, a load-supporting roller bearing upon the upper periphery of said tread, elastic resilient means in horizontal alinement with the axle journal for retaining the center of said tread substantially in vertical alinement with the axes of said load supporting roller and for limiting elliptical deflection of said tread, and means for adjusting said retaining and limiting means to regulate elliptical deflection of said tread, for the purpose described.

11. A wheel of the character designated, comprising an annular elastic resilient tread, a load-supporting roller bearing upon the upper periphery of said tread, a suspender pendent from the axis of said load supporting roller and supporting an axle journal, horizontal extensions on said suspender, and buffer rollers mounted on said horizontal extensions and arranged to retain the center of said tread substantially in vertical alinement with said load supporting roller, for the purpose described.

12. A wheel of the character designated, comprising an annular elastic resilient tread, a load-supporting roller bearing upon the upper periphery of said tread, a suspender pendent from the axis of said load supporting roller and supporting an axle journal, horizontal extensions on said suspender, and buffer rollers mounted on said horizontal extensions and provided with elastic resilient means for retaining the center of said tread in substantial vertical alinement with said load supporting roller, for the purpose described.

13. A wheel of the character designated, comprising an annular elastic resilient tread, a load supporting roller bearing upon the upper periphery of said tread, a suspender pendent from the axis of said load supporting roller and supporting an axle journal and also supporting at its lower extremity a buffer roller for limiting the vertical depression of said elastic resilient tread, said suspender being also formed with horizontal extensions in alinement with said axle journal, and buffer rollers mounted on said horizontal extensions and arranged to restrict the horizontal deflection of said tire, for the purpose described.

14. A wheel of the character designated, comprising an annular elastic resilient tread, a load supporting roller bearing upon the upper periphery of said tread, a suspender pendent from the axis of said load supporting roller and supporting an axle journal and also supporting at its lower extremity an elastic resilient buffer for limiting the vertical depression of said tread, said suspender being also formed with horizontal extensions in alinement with said axle journal, and elastic resilient buffers mounted on said horizontal extensions and arranged to restrict the horizontal deflection of the tire, for the purpose described.

15. A wheel of the character designated, comprising an annular elastic resilient tread, a load supporting roller bearing upon the upper external periphery of said tread, an opposed wheel bearing against the inner surface of the tread in vertical alinement with said load supporting roller, means for supporting said opposed bearing wheel against lateral movement while admitting of its vertical movement, said means consisting of an extension of the axis of said bearing wheel and of a fixed socket piece formed with a vertical slot for the reception of said extension of the axis of the bearing roller, for the purpose described.

16. In combination, an elastic resilient tread of the character designated, a load supporting roller bearing upon the upper periphery of said tread, a suspender pendent from the axis of said load supporting roller, an axle journaled in said suspender, springs interposed between said axle and the chassis of the vehicle and supporting the latter, and means mounted on said suspender for prescribing the elliptical deflection of said tread, for the purpose described.

CHRISTOPHER PEEL.

Witnesses:
DOROTHY MIATT,
GEO. WM. MIATT.